United States Patent [19]

Regitz et al.

[11] 3,863,230

[45] Jan. 28, 1975

[54] MOS MEMORY DECODER CIRCUIT

[75] Inventors: William M. Regitz, Cupertino; John A. Reed, Los Altos, both of Calif.

[73] Assignee: Intel Corporation, Santa Clara, Calif.

[22] Filed: July 18, 1973

[21] Appl. No.: 380,350

[52] U.S. Cl. ............ 340/173 R, 307/205, 307/208, 307/244

[51] Int. Cl. ............................................ G11c 7/00

[58] Field of Search ......... 340/173 R; 307/205, 208, 307/244

[56] References Cited

UNITED STATES PATENTS

| | | | |
|---|---|---|---|
| 3,760,380 | 9/1973 | Hoffman et al. | 340/173 R |
| 3,778,782 | 12/1973 | Kitagawa | 340/173 R |
| 3,778,784 | 12/1973 | Karp et al. | 340/173 R |

OTHER PUBLICATIONS

Hoff, Silicon-Gate Dynamic MOS Crams 1,024 bits on a chip, Electronics, 8/3/70, pp. 68–73.

*Primary Examiner*—Stuart N. Hecker
*Attorney, Agent, or Firm*—Spensley, Horn & Lubitz

[57] ABSTRACT

A decoder circuit for a metal-oxide-semiconductor (MOS) memory array which employs a single clock or timing signal is disclosed. Inverter buffers are utilized with a plurality of different decoder logic circuits. Discrimination of each input address is accomplished by the structurally different decoder logic circuits as opposed to the prior art technique of selecting different buffered address inputs.

2 Claims, 4 Drawing Figures

MOS MEMORY DECODER CIRCUIT

BACKGROUND OF THE INVENTION

1. Field of the Invention

The invention relates to the field of MOS decoder circuits.

2. Prior Art

In MOS memory arrays an input address to the array is decoded and the address interpreted so as to activate a particular cell in the array or a particular line or column in the array. In the prior art this has primarily been accomplished by selectively coupling the address and the inverse of the address to a plurality of identical decoder circuits. This prior art technique will be explained in detail in conjunction with FIG. 1. A problem with this prior art technique is that more than a single timing signal is required and, additionally, that longer access time is required as compared to the presently disclosed technique. Also, as will be seen with the presently disclosed circuit, a minimum amount of power is required.

SUMMARY OF THE INVENTION

A decoder circuit for an MOS memory array which utilizes a single clock or timing circuit is described. The address to a decoder circuit is first applied to an inverter buffer which inverts the address and provides inverted address outputs which are synchronized with the timing signal. A feedback loop within each inverter maintains an output at the inverter for the remainder of each timing frame even though the input address has been removed. The output from the inverters are coupled to a plurality of logic decoders. Each logic decoder comprises a plurality of MOS devices, some of which are coupled in series, and the remainder of which are coupled in parallel. The series and parallel combination of these devices are utilized for providing an output signal when the proper address is applied to the logic decoder. In the presently preferred embodiment, each logic decoder is used for activating either a column of the array or a line of the array. Each such logic decoder is structurally different and this difference in structure determines the logic function performed by each of the logic decoders. Each logic decoder also includes a bootstrap circuit for bootstrapping an output MOS device such that the output from the logic decoder approaches the potential applied to the decoder.

DETAILED DESCRIPTION OF THE INVENTION

Figure 1:
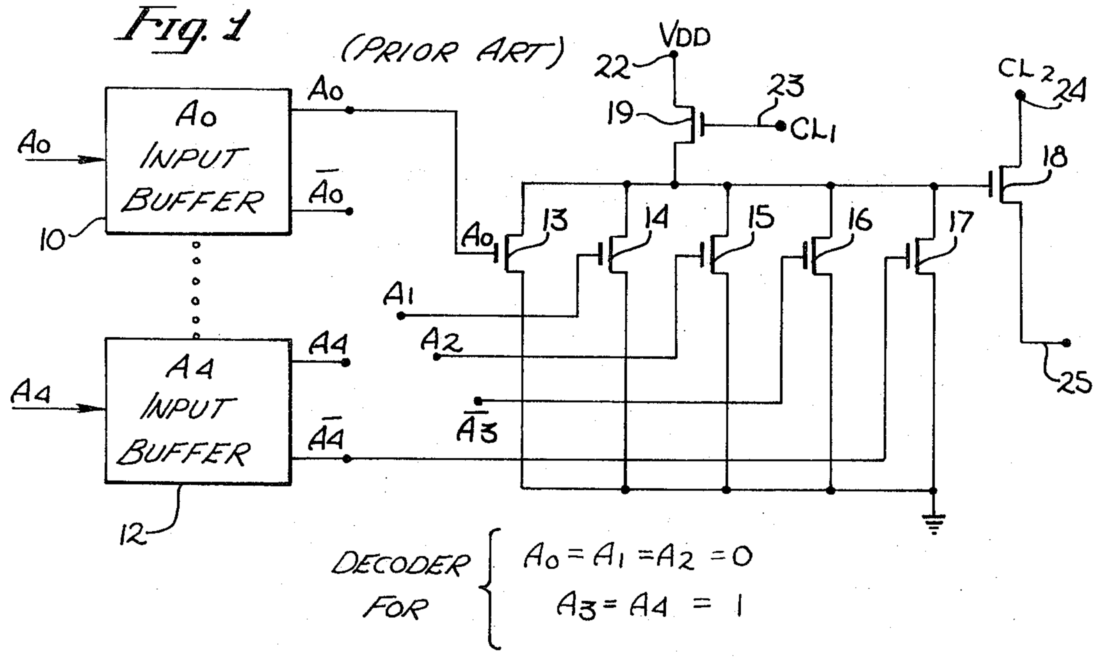
FIG. 1 is an electrical schematic used to illustrate the prior art technique of decoding.

Referring first to FIG. 1, there is shown therein the prior art technique for decoding an address which, for purposes of explanation, is assumed to consist of $A_0$, $A_1$, $A_2$, $A_3$ and $A_4$. The address is applied to a plurality of input buffers such as input buffers 10 and 12 of FIG. 1. In order not to over-complicate the drawing of FIG. 1, only two input buffers have been illustrated, but it will be appreciated that in order to decode the address, input buffers will also be required for $A_1$, $A_2$ and $A_3$. Each buffer produces two output signals, one being the address or portion of the address applied to the buffer and the other being the inverse of this address. For example, the $A_0$ input buffer has its output $A_0$ and $\bar{A}_0$.

In the prior art decoding technique a plurality of decoding circuits are utilized and the output of each of these decoding circuits used to activate a particular line or column in a memory array. In FIG. 1, a typical prior art decoding circuit is illustrated and comprises MOS devices 13, 14, 15, 16 and 17, all coupled in parallel between ground and the junction formed by one terminal of MOS device 19 and the gate of MOS device 18. The other terminal of MOS device 19 is coupled to a source of potential 22 indicated as $V_{DD}$ and the gate of MOS device 19 is coupled to a timing signal $CL_1$. One terminal 25 of MOS device 18 is the output of the decoding circuit while the other terminal 24 is coupled to a second timing signal $CL_2$.

The particular decoding circuit illustrated in FIG. 1 will produce an output signal on line 25 when $A_0$, $A_1$ and $A_2$ are equal to 0 and when $A_3$ and $A_4$ are equal to 1. The gates of MOS devices 13, 14 and 15 are coupled to the non-inverted outputs from the $A_0$, $A_1$ and $A_2$ buffers while the gates of MOS devices 16 and 17 are coupled to the inverted outputs, $\bar{A}_3$ and $\bar{A}_4$, respectively, of the $A_3$ and $A_4$ input buffers. Thus, when the condition $A_0 = A_1 = A_2 = 0$ and $A_3 = A_4 = 1$, no conductive path will exist to ground from the gate of device 18.

In operation of the circuit of FIG. 1, first a timing signal $CL_1$ is applied to lead 23 causing device 19 to conduct and charging the gate of MOS device 18. If the logic of the circuit has been met and no conductive path exists to ground when at a subsequent time $CL_2$ is applied to terminal 24 of MOS device 18, a conductive path will exist through device 18, thereby providing an output signal on lead 25. Note that in the prior art devices, it is necessary that $CL_1$ and $CL_2$ must be separated in time. If they were not a current path could exist through device 19 to ground, causing an excess amount of power to be required by the circuit. This separation in time of $CL_1$ and $CL_2$ causes the access time in the prior art memories to be longer than is required for the present invention.

With the prior art decoding technique, the decoder circuit illustrated in FIG. 1 may be utilized to decode any desired address by connecting the circuit to the appropriate terminals of the input buffers. That is to say, it is the connections to the input buffers that determine the logic function which will be performed by the circuit and not the configuration of the MOS devices 13 – 19. As will be seen with the present invention, it is not the interconnections but rather the particular structure of the circuit which determines the logic function performed by each of the logic decoders.

The presently preferred embodiment of the invention is utilized in a random-access-memory having a capacity of 1,024 bits and arranged in a 32 by 32 array. The entire memory array, including the decoder circuit of the present invention, are fabricated on a single substrate utilizing known MOS technology. In the presently preferred embodiment, all the MOS devices comprise $n$-channel field-effect transistors which employ polycrystalline silicon gates. Other circuits utilized in this random-access-memory are disclosed in copending applications, Ser. No. 380,349, filed July 18, 1973, Ser. No. 380,348, filed July 18, 1973, and Ser. No. 380,347, filed July 18, 1973, all of which are assigned to the assignee of the present application.

Unlike many prior art memory arays, the present memory array employs a single timing signal which is applied to the memory array. The complement of this timing signal is generated on the memory chip and is utilized along with the non-inverted timing signal for controlling the decoder circuit of the present invention. The non-inverted timing signal is designated as CL throughout this description and the complement or inverse of this signal is designated as $\overline{CL}$.

The decoder circuit of the present invention comprises a plurality of input buffers which substantially invert the input address and a plurality of logic decoders, each of which carry out a predetermined logic function and have an output which activates a predetermined section of the memory array. In the presently preferred embodiment five input buffers and logic decoders are utilized for the selection of lines in the array and an additional five input buffers and logic decoders are utilized for selecting the various columns in the array.

Figure 2:
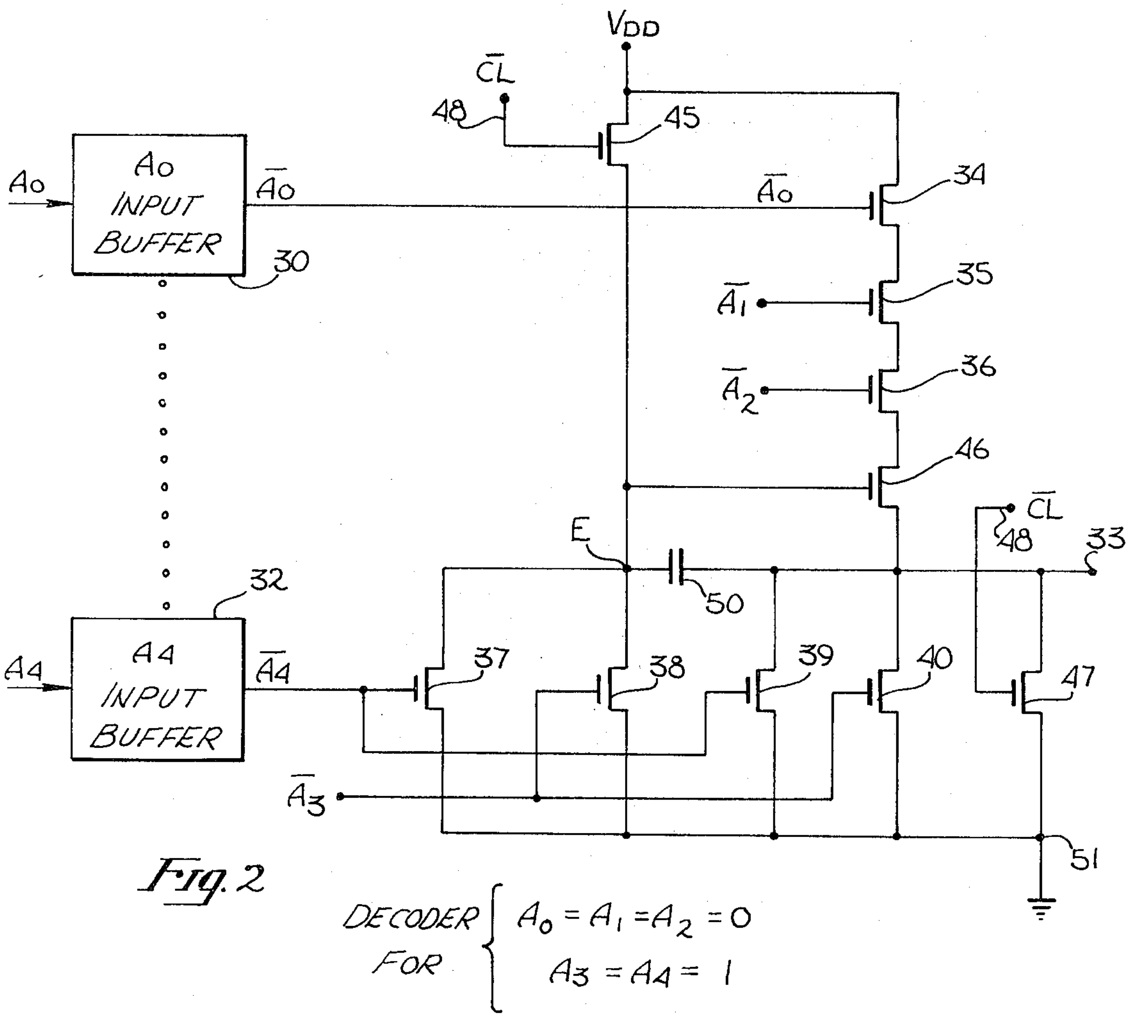
FIG. 2 is an electrical schematic which illustrates a single logic decoder utilized in the present invention coupled to a plurality of input buffers.

Referring to FIG. 2, the input address to the decoder circuit is illustrated as $A_0$, $A_1$, $A_3$ and $A_4$. The logic decoders utilize only the inverse of the address designated $\overline{A_0}$ through $\overline{A_4}$ and, hence, the input buffers 30 and 32 and the input buffers for $A_1$, $A_2$ and $A_3$ not illustrated, invert the input address. As will be explained in greater detail in conjunction with FIG. 4, the buffers provide an output signal which does not change state so long as the timing signal CL does not change state. The output of each of the input buffers is coupled to each of the logic decoders.

The logic decoder illustrated in FIG. 2 provides an output signal on lead 33 when the input address to the buffers is $A_0 = A_1 = A_2 = 0$ and $A_3 = A_4 = 1$. (It is assumed that a 1 is a positive potential which will cause the $n$-channel enhancement mode devices utilized in the presently preferred embodiments to conduit and a 0 represents a zero potential which will prevent the n-channel enhancement mode devices from conducting.) The logic decoder of FIG. 2 includes a plurality of MOS devices in series (MOS devices 34, 35 36 and 46) and a plurality of MOS devices in parallel (MOS devices 37, 38, 39, 40 and 47). The gate of MOS device 34 is coupled to the output of buffer 30 and receives the portion of the address designated as $\overline{A_0}$. The gates of MOS devices 34 and 35 are in a similar manner coupler to the outputs of the $A_1$ and $A_2$ buffers, not illustrated. The gates of MOS devices 37 and 39 are coupled to the output of buffer 32 and receive the portion of the address designated as $\overline{A_4}$. In a similar manner the gates of MOS devices 38 and 40 are coupled to the output of the $A_3$ input buffer. MOS device 46, hereinafter sometimes referred to as the output device, couples MOS devices 34, 35 and 36 with the output line 33. The gate of device 46 is coupled to node E, this node being common with one terminal of capacitor 50 and one terminal of MOS devices 37, 38 and 45. The other terminal of MOS device 45 is coupled to $V_{DD}$ as is one terminal of MOS device 34. The gate of MOS device 45 is coupled to lead 48, the lead to which the $\overline{CL}$ signal is applied. MOS devices 37 and 38 are coupled in parallel between node E and ground 51. The output line 33 is coupled to one terminal of device 47 and to the other terminal of capacitor 50. MOS device 47 has its gate coupled to the CL line 48 and its other terminal coupled to ground 51.

Assume for the purposes of explanation that an input address is applied to the circuit of FIG. 2 comprising $A_0 = A_1 = A_2 = 0$ and $A_3 = A_4 = 1$. Prior to the time that this address appears at the output of the buffers 30 and 32 and the other buffers not illustrated, assume further that the $\overline{CL}$ signal has been positive and that device 45 has conducted charging node E to a potential of $V_{DD}$ less the threshold drop of MOS device 45. Additionally, note that the $\overline{CL}$ signal would have caused device 48 to conduct, thereby grounding lead 33. During the time that CL becomes positive and CL drops to zero, assume that the inverse of the address is applied to the logic decoder of FIG. 2 from the inverter buffers. This address will cause devices 34, 35 and 36 to conduct. This occurs since the inversion of $A_0$ $A_1 = A_2 = 0$ is applied to the gates of devices 34, 35 and 36, respectively, hence a 1 is applied to the gates of MOS devices 34, 35 and 36. Device 46 will also conduct since node E has previously been charged. The potential $V_{DD}$, the source of potential used to power the circuit, is coupled through devices 34, 35, 36 and 46 to line 33. The portion of the address which comprises $A_3$ and $A_4$ after being inverted, is equal to zero, hence, devices 39 and 40 will not conduct and line 33 will not be brought to ground through these devices. Lead 48 during this time is coupled to a zero potential and, hence, device 47 will not conduct.

Device 47 operates along with capacitor 50 to bootstrap node E when the proper address has been applied to the circuit. Note that during the time that $\overline{CL}$ is high, capacitor 50 is charged to a potential of $V_{DD}$ less the threshold of device 45. When the appropriate address is applied to the circuit the terminal of capacitor 50 which includes line 33 will approach $V_{DD}$ through the path comprising devices 34, 35, 36 and 46. Thus, the voltage at node E will then include the potential on lead 33 plus the potential on capacitor 50.

An important feature of the circuit of FIG. 2 is that if other than the address that produces the output from the decoder is applied to the logic decoder, no current path exists from $V_{DD}$ to ground. If either $A_3$ or $A_4$ are equal to zero when they are applied to the input of the buffers, either or both of devices 37 and 38 will conduct, bringing node E to ground. When this occurs device 46 will not conduct and even if devices 34, 35 and 36 are conducting, no current path will exist between $V_{DD}$ and ground since device 46 is not conducting. Similarly, if either of the signals applied to the devices 34, 35 and 36 are zero, no current path will exist between $V_{DD}$ and ground, even though both devices 39 and 40 may be conducting. Thus, the presently disclosed decoder circuit does not require a large amount of power even though it utilizes only a single timing signal, that is CL and $\overline{CL}$. Note that with the prior art circuit, if only a single timing circuit was utilized, substantial current would be drawn even when no output signal is present on line 25 of FIG. 1.

Figure 3:
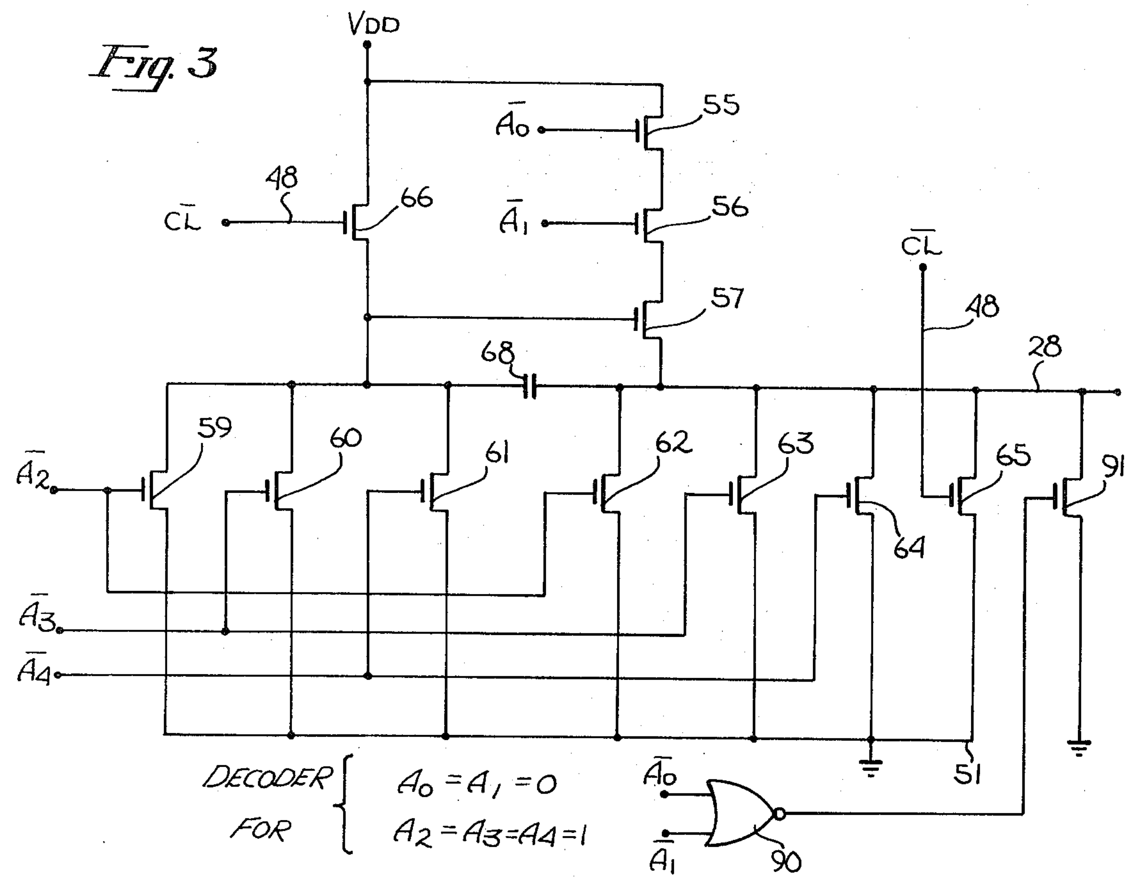
FIG. 3 is an electrical schematic of another logic decoder of the present invention and is utilized in conjunction with FIG. 2 to demonstrate the manner in which the structure of each of the logic decoders is changed to accomplish the required logic function.

Referring to FIG. 3, another decoder logic circuit built in accordance with the present invention is illustrated, this circuit for recognizing the address $A_0 = A_1 = 0$ and $A_2 = A_3 = A_4 = 1$. Note that while the circuit of FIG. 2 had three devices in series which were coupled to the input buffers, the circuit of FIG. 3 has only two devices coupled in series which are coupled to the input buffers, these being MOS devices 55 and 56. Likewise, while the circuit of FIG. 2 had two pairs of two devices in parallel which were coupled to the input buffers, the circuit of FIG. 3 has two pairs of three devices coupled in parallel (devices 62, 63 and 64 and devices 59, 60 and 61.)

The circuit of FIG. 3 includes an output MOS device 57 which corresponds to device 56 of FIG. 2. This device couples the series combination of devices 55 and 56 with the output line 28. An MOS device 65 has its gate coupled to line 48 and is utilized to bring line 28 to ground potential during the time that $\overline{CL}$ is high. The gates of devices 55 and 56 are coupled to the outputs of the $A_0$ and $A_1$ buffers, respectively, while the gates of devices 62, 63 and 64 are coupled to the outputs of the $A_2$, $A_3$ and $A_4$ buffers, respectively. As was the case with the circuit of FIG. 2, one terminal of devices 62, 63, 64 and 65 are coupled to lead 22, and one terminal of the capacitor 68. The other terminal of capacitor 68 is coupled to the gate of device 57 and one terminal of devices 59, 60 61 and 66. The other terminal of devices 59, 60 and 61 are coupled to ground 51. The gates of devices 59, 60 and 61 are coupled to the output of the $A_2$, $A_3$ and $A_4$ buffers, respectively.

The circuit of FIG. 3, although structurally different than the circuit of FIG. 2, operates in substantially the same manner. Assume, that an address is applied to the input buffers such that $A_0 = A_1 = 0$ and $A_2 = A_4 = 1$. Devices 55 and 56 would conduct and devices 62, 63 and 64 would not conduct and hence a current path would exist from $V_{DD}$ to line 28 through devices 55, 56 and 57. As was the case with the circuit of FIG. 2, the gate of MOS device 57 would be charged during the time that $\overline{CL}$ is positive through device 66. Capacitor 68 also bootstraps the gate of MOS device 57 provided that the appropriate address has been applied to the circuit of FIG. 3. In comparing FIGS. 2 and 3, it may be readily seen that any desired combination of the addresses $A_0$, $A_1$, $A_2$, $A_3$ and $A_4$ may be decoded by utilizing the appropriate number of MOS devices in series and in parallel.

In some cases, it has been found that charge may accumulate between some of the series devices in the decoder and that this charge may be transferred onto the output line causing a malfunction in the memory. For example, referring to FIG. 3, assume device 55 conducts and device 56 is not conducting (note the conditions of the inputs to the circuit required for an output signal are not met). A charge may be stored between devices 55 and 56 after device 55 ceases to conduct. At a subsequent time, assume device 56 is conducting and that devices 62, 63 and 64 are not conducting (once again, the conditions for an output signal from the circuit are not met since devices 55 is not conducting). The charge previously stored between devices 55 and 56 may be transferred onto line 28 possibly causing an unselected line in the array to be erroneously selected. This problem is solved by the use of gate 90.

Gate 90, which may be an ordinary NOR gate has its output coupled to the gate of MOS device 91. Its inputs are the $\overline{A_0}$ and $\overline{A_1}$ signals. Device 91 is coupled between line 29 and ground. Any time that either $A_0$ or $A_1$ are positive line 28 is grounded by device 91. Thus, any charge that may have accumulated between these devices will not be transferred to line 28 unless $A_0=A_1=0$. If $A_0=A_1=0$ and also if $A_2=A_3=A_4=1$ then the transfer of any accumulated charge into line 28 will not be harmful since line 28 has beeen selected. If $A_0=A_1=0$ but $A_2$, $A_3$ and $A_4$ are all not equal to 1, then at least one of devices 62, 63 or 64 will conduct causing the accumulated charge to be directed to ground. NOR gates may likewise be used for any of the logic decoders, such as the decode of FIG. 2 for this purpose.

Figure 4:
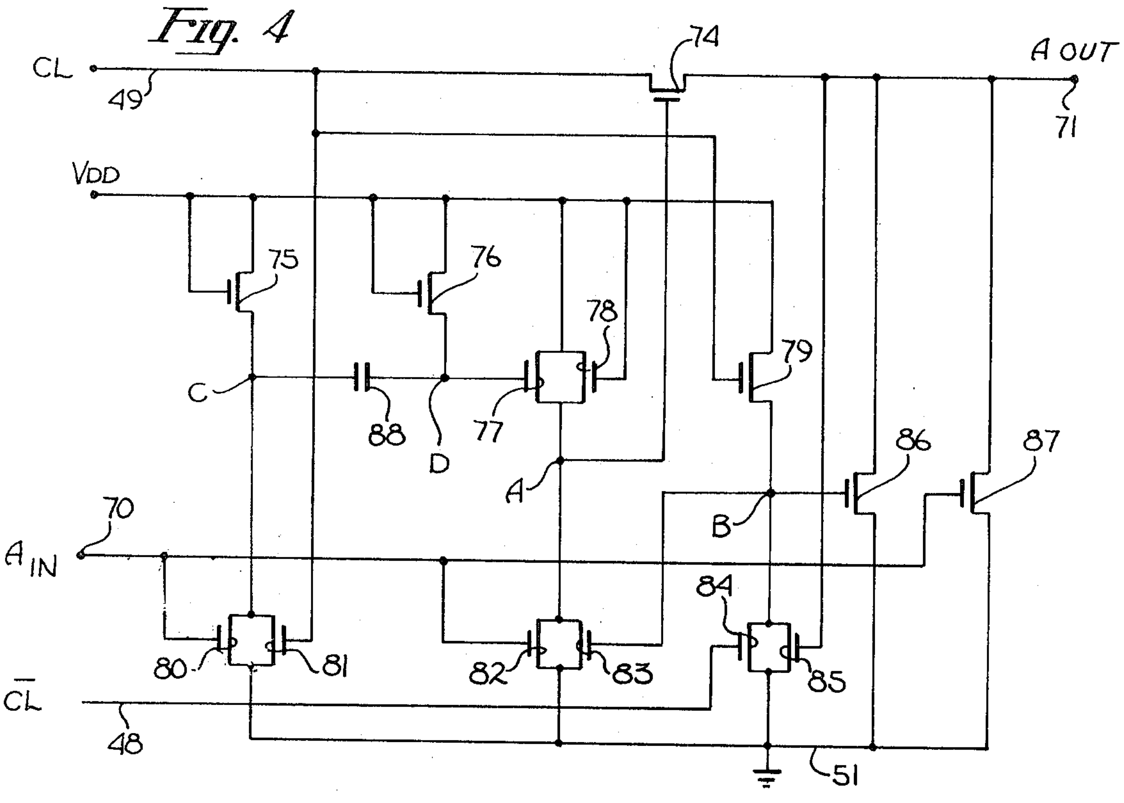
FIG. 4 is an electrical schematic of the input buffer utilized in the present invention.

Referring to FIG. 4, an inverter buffer utilized in the present invention such as buffers 30 and 32 illustrated in FIG. 2 is shown. The input to the buffer is shown as $A_{in}$ (line 70) and the output from the buffer is shown as $A_{out}$ (line 71). The timing signals used by the buffer are CL line 49 and $\overline{CL}$ line 48. An output MOS device, device 74 is coupled between line 49 and the output line 71. The gate of this device is coupled to node A. Two paths exist to ground from node A, one through MOS device 82 and the other through MOS device 83. The gate of MOS device 82 is coupled to the input line, line 70, while the gate of MOS device 83 which acts as a feedback device, is coupled to node B. As will be seen, node A is charged to $V_{DD}$ when the CL signal is low (or zero) and when the $\overline{CL}$ signal is high (or positive) for the *n*-channel devices used in the presently preferred embodiment.

An additional feedback device, MOS device 85, has its gate coupled to the output line and interconnects node B with ground 51. Node B is also coupled to ground through MOS device 84 which has its gate coupled to the $\overline{CL}$ line. MOS devices 86 and 87 are coupled between the output line and ground 51 with the gate of device 86 being coupled to node B and the gate of device 87 being coupled to the input line 70. MOS device 79 which is utilized to charge node B has one of its terminals coupled to $V_{DD}$ and its other terminal coupled to node B. The gate of device 79 is coupled to the CL line 49. MOS device 78, which is utilized to charge node A, has one of its terminals coupled to $V_{DD}$ and the other of its terminals coupled to node A. The gate of device 78 is coupled to $V_{DD}$.

MOS devices 75, 76, 80 and 81 operate to bootstrap node D or the gate of MOS device 77. MOS device 77 has one of its terminals coupled to $V_{DD}$ and the other of its terminals coupled to node A. One terminal of capacitor 88 is coupled to one terminal of MOS device 76 while the other terminal and gate of MOS device 76 are coupled to $V_{DD}$. The other terminal of capacitor 88 is coupled to one terminal of MOS devices 75, 80 and 81. The other terminal and gate of MOS device 75 are coupled to $V_{DD}$. The other terminals of MOS devices 80 and 81 are coupled to ground 51. The gate of MOS device 80 is coupled to the input line 70 and the gate of device 81 is coupled to the CL line.

The operation of the circuit of FIG. 4 first will be examined for the condition when the input to line 70 is a 1 or positive. As will be seen from the following discussion of the circuit of FIG. 4, the output signal on line 71 is synchronized with the timing signal CL. In operation of the circuit the bit of the address applied to line 70 is removed prior to the time that the timing signal CL changes state, but because of the feedback provided through devices 83 and 85, the inversion of the signal applied to line 70 appears on line 71 until the timing signal CL changes state. Thus, for the purposes of explanation, it will be assumed that the timing signals $\overline{CL}$ and CL are being applied to lines 48 and 49.

When a 1 or positive potential is applied to the input line 70 is causes device 87 to conduct and hence the output line 71 is substantially coupled to ground 51 through device 87. Since the gate of device 85 is coupled to the output line 71, this device will not conduct and node B will be at a potential equal to $V_{DD}$ less the threshold drop through MOS device 79. Note that device 79 is conducting since its gate is coupled to CL and it is assumed for the purposes of discussion, that CL is at a positive potential. Node B, which is coupled to the gate of device 83, causes device 83 to conduct, thereby causing node A to be substantially coupled to ground potential. (Also, the potential on node B causes device 86 to conduct.) The potential applied to the input line causes device 82 to conduct discharging node A. Thus, the gate of the output MOS device 74 is substantially coupled to ground through MOS devices 82 and 83. MOS devices 83 and 85 provide feedback from the output line which cause the output line to remain substantially at ground potential, even when the input signal is removed from line 70, so long as a 1 remains on the CL line 49.

Assume now that a zero is applied to the input line 70 and that at the same time the CL line is positive. Node A which will have been previously charged, will immediately cause device 74 to conduct and, hence, the potential on the output line 75 will begin to rise towards the potential on line 49. This potential will cause device 85 to conduct, thereby discharging node B. The discharging of node B prevents MOS devices 83 and 86 from conducting. Since device 83 is not conducting, node A remains charged. Note at this time since a 1 exists on line 70, device 82 is not conducting, nor is device 87 conducting.

In order for the circuit of FIG. 4 to operate in its presently preferred embodiment, the input address applied to line 70 must be a 0 or return to 0 at the time when the CL signal drops from its positive state to its low or zero state. The feedback provided by devices 83 and 85 enables this to occur without changing the state of the output signal at least until the timing signal changes state. Each time the timing signal CL changes from a positive to a zero potential, device 81 ceases conducting, thereby changing the potential on node C. The change of potential of node C is transferred to node D through capacitor 88, causing node D to rise to a potential greater than $V_{DD}$. Note that node C is coupled to $V_{DD}$ through device 75 and during the time that CL is in a positive state node C is at ground potential. More specifically, when the CL timing signal changes from a positive state to zero potential, node C moves from ground potential to a potential equal to $V_{DD}$ less the threshold drop of MOS device 75. Node D on the other hand, is normally at a potential equal to $V_{DD}$ less the threshold drop of MOS device 76. As the potential of node C changes from ground to a potential approaching $V_{DD}$, this change of potential is reflected on node D, causing MOS device 76 to be back biased and allowing node D to increase in potential to a potential greater than $V_{DD}$. This high potential on node D and the gate of device 77 causes node A to be charged to a potential equal to $V_{DD}$ through MOS device 77. This charge remains on node A during the time that $\overline{CL}$ is positive. Then, as previously explained, if a 1 is applied on line 70, node A is discharged through devices 82 and 83 and if a 0 is placed on line 70, node A remains charged to $V_{DD}$ and is used to drive the output MOS device 74.

Thus, a decoding circuit has been disclosed which includes a plurality of inverter buffers and a plurality of structurally distinct logic decoders. The circuit has the advantage over the prior art in that it only requires a single clock pulse thereby reducing the complexity and increasing the access time of the memory. Furthermore, all the stages of the system are dynamic thereby greatly reducing the power dissipation associated with some prior art circuits.

We claim:

1. In a decoder for a memory which produces an output signal upon recognition of a predetermined address with a decoder circuit which includes at least two transistors in parallel which receive a portion of said address, and at least two transistors in series which receive the remainder of said address, a circuit for preventing said output signal from being produced without receipt by said decoder of said predetermined address, due to electrical charge being stored on said transistors in series comprising:

logic circuit means for recognizing a predetermined electrical condition including terminals for receiving said remainder of said address; and, disenabling means for preventing the production of said output signal coupled to said logic circuit means;

whereby upon recognition by said logic circuit means of said predetermined electrical condition said decoder is prevented from producing said output signal.

2. The circuit defined in claim 1 wherein said disenabling means comprises a transistor for discharging an output line.

* * * * *